(12) United States Patent
Tudor et al.

(10) Patent No.: US 8,973,825 B2
(45) Date of Patent: Mar. 10, 2015

(54) METHOD AND SYSTEM FOR SAFE USE OF MAGNETIC STRIP CARDS

(75) Inventors: Mircea Tudor, R-Bucuresti 1 (RO); Adrian Bizgan, R-Bucuresti 3 (RO); Valentin Boanta, R-Bacău (RO)

(73) Assignee: MB Telecom Ltd. SRL, Otopeni (RO)

( * ) Notice: Subject to any disclaimer, the term of this patent is extended or adjusted under 35 U.S.C. 154(b) by 0 days.

(21) Appl. No.: 13/703,919

(22) PCT Filed: Feb. 25, 2011

(86) PCT No.: PCT/RO2011/000009
§ 371 (c)(1),
(2), (4) Date: Dec. 13, 2012

(87) PCT Pub. No.: WO2011/162629
PCT Pub. Date: Dec. 29, 2011

(65) Prior Publication Data
US 2013/0087615 A1    Apr. 11, 2013

(30) Foreign Application Priority Data
Jun. 24, 2010   (RO) .............................. A201000545

(51) Int. Cl.
*G06K 7/08* (2006.01)
*G06K 7/015* (2006.01)
(Continued)

(52) U.S. Cl.
CPC ............... *G06K 7/015* (2013.01); *G06K 7/082* (2013.01); *G06K 13/08* (2013.01); *G06K 13/085* (2013.01); *G07F 19/2055* (2013.01)
USPC ....................................................... 235/449

(58) Field of Classification Search
CPC ...................................................... G06K 19/04
USPC ........................... 235/451, 475, 483–485, 449
See application file for complete search history.

(56) References Cited

U.S. PATENT DOCUMENTS 4,581,523 A  *  4/1986  Okuno ........................... 235/479
4,800,551 A  *  1/1989  Norris ........................... 720/618
(Continued)

FOREIGN PATENT DOCUMENTS

DE     10 2006 049 204 B3     1/2008
DE       102006049204 A   *   1/2008
(Continued)

OTHER PUBLICATIONS

International Search Report (PCT/ISA/210) issued on Aug. 18, 2011, by the Romania Patent Office as the International Searching Authority for International Application No. PCT/RO2011/000009.

*Primary Examiner* — Sujoy Kundu
*Assistant Examiner* — Steven J Malone
(74) *Attorney, Agent, or Firm* — Buchanan Ingersoll & Rooney PC

(57) ABSTRACT

This invention relates to a method and system to ensure the safe use of magnetic strip cards in order to prevent the theft of information contained in the magnetic strip of a industry standard magnetic strip card. Security system enabling the safe use of magnetic strip cards that implements the method, composed of a half-cylinder, equipped with a special slot of a thickness almost similar to the magnetic strip card and wide of one card length, a mechanical card loading and rotating device, card presence and position sensors, electrical motors for the mechanical system, an overall electronic command and control module and the physical security box containing all parts of the system.

2 Claims, 3 Drawing Sheets

Figure 1:
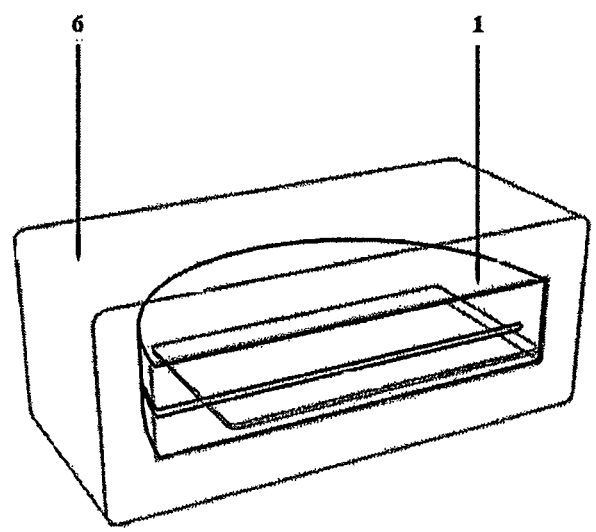

(51) Int. Cl.
*G06K 13/08* (2006.01)
*G07F 19/00* (2006.01)

(56) References Cited

U.S. PATENT DOCUMENTS 7,328,897 B2 * 2/2008 Bryant et al. .................. 271/225
8,418,917 B1 * 4/2013 Lewis et al. ................... 235/379
2005/0236482 A1 * 10/2005 Olette ........................... 235/454
2006/0211288 A1 * 9/2006 Ishii .............................. 439/159
2009/0121409 A1 * 5/2009 Stender et al. ............... 271/9.01
2014/0054368 A1 * 2/2014 Li et al. ........................ 235/379

FOREIGN PATENT DOCUMENTS

EP        0 597 135 A1    5/1994
EP        597135 A1 * 5/1994

* cited by examiner

METHOD AND SYSTEM FOR SAFE USE OF MAGNETIC STRIP CARDS

This invention relates to a method and system to ensure the safe use of magnetic strip cards in order to prevent the theft of information contained in the magnetic strip of a industry standard magnetic strip card.

The applicability of this invention addresses the physical safety of magnetic strip cards and the security of embedded private information.

It's common knowledge that frauds on magnetic strip cards delivered by financial institutions are increasingly widespread IT crimes causing severe material damage and urging further precautions by issuers of cards, which ultimately is leading to a more complex use of such cards. Frauds to ATMs or to any devices using magnetic strip cards for cash payment or cash withdrawal is globally known as "card skimming". This type of crime has thoroughly and rapidly spread in the recent years with major consequences on losses, across the world and the main reason for such increased trans-border crime rate is the poor effectiveness of current security systems.

To avoid this, the world association of magnetic strip card issuers, EMV (EUROPAY, MASTER and VISA) implemented the integrated chip solution for bank cards which actually slowed down the spreading of crimes in Western Europe and shifted the focus of perpetrators to East and mainly to the United States of America.

Currently, there are several anti-skimming solutions and systems in use, such as the slow and gradual removal of the card or protection devices for card insertion slot, bur their capacity to stop the phenomenon is rather symbolic as their existence did nothing but to encourage offenders to find more efficient and improved solutions.

To limit fraud, issuers and producers of magnetic strip cards defined internal rules to limit payments or to modify cards, which clearly brought further costs. One of the in-house protection solutions stipulates that users from abroad must confirm any cash withdrawal by phone. Such instances have also a negative impact on the image besides the financial disadvantage and are weakening or otherwise shake faith in financial institutions issuing magnetic strip cards, as well as discourage the use of card transactions.

The proposed method to increase security of magnetic strip cards usage eliminates all disadvantages mentioned above, by receiving the card perpendicularly compared to regular use, and shifting it with 90° afterwards to reintegrate the card to the regular flow. This method makes any skimmer-type data reading device futile in the sense that in order to read data, the skimmer actually needs to pass the magnetic strip gradually, over a reading head. The perpendicular insertion of the card, compared to regular use, makes the reading of magnetic strip-embedded data impossible.

The system that implements the method presented above, consists of a half-cylinder with a special slot of a thickness almost similar to the magnetic strip card and wide of one card length, a mechanical card loading and rotating device, card presence and position sensors, motors to drive the mechanical system, an electronic command and control module of the system and a solid security box in which all system components are installed.

The system proposed, according to the invention, accepts the magnetic strip card in a manner that renders useless any skimming device, as the card is no longer inserted on the strip reading direction. Once received and secured in the rotating half-cylinder, the card is rotated with 90° and introduced in the regular operational flow of the magnetic card device.

All magnetic strip card readers, both authorized and illegal, read data by passing the strip. over a reading head which gradually retrieves the embedded information. Illegal readers are at all times concealed in front of the card's insertion slot to record information from all cards used.

Figure 2:
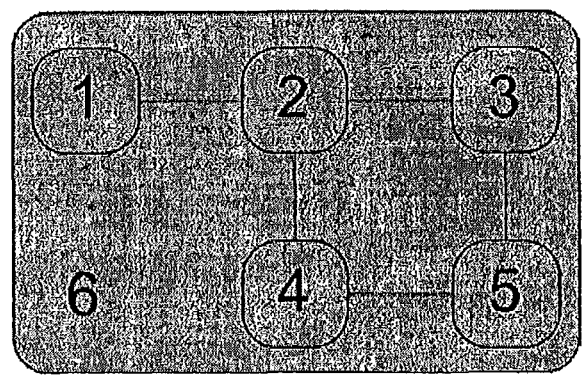

The invention has the following advantages:
Makes impossible the reading of data embedded on magnetic cards by illegal devices
Eliminates frauds perpetrated by the unauthorized reading of strip embedded data
Increases the efficiency of the electronic payment system through the opportunity to remove internal safety measures imposed by magnetic strip card issuers and producers Further is presented an example of implementing of the invention in connection with the figures from 1 to 3 that describe:

FIG. 1—perspective of the magnetic card security system, according to the invention FIG. 2—block diagram of the proposed magnetic card security system.

Figure 3:
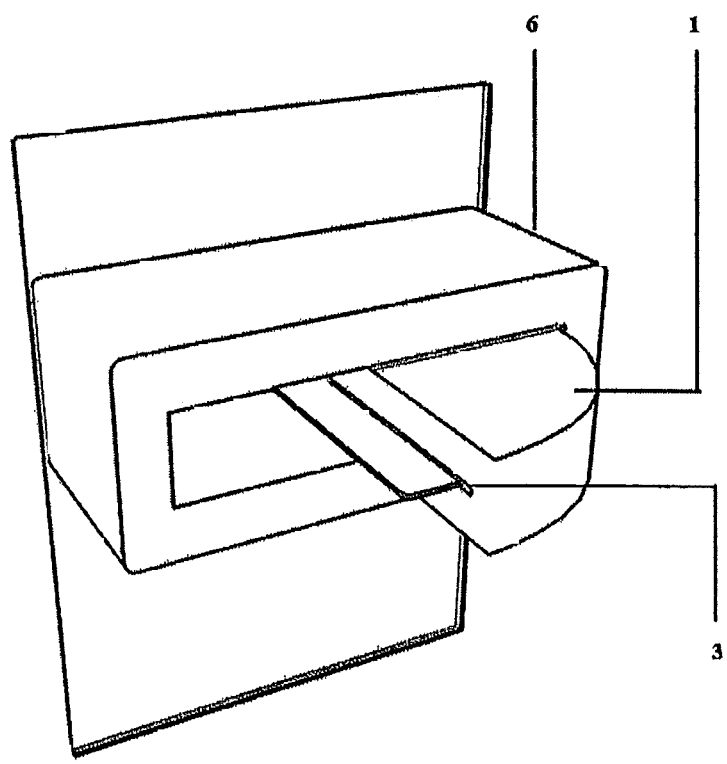

FIG. 3—example installation on an existing ATM

The system for the safe use of the magnetic strip cards includes in the proposed model a half-cylinder 1 equipped with a special slot of a thickness almost similar to the magnetic strip card and wide of one card length, a mechanical card loading and rotating device 2, card presence and position sensors 3, electrical motors for the mechanical system 4, the overall electronic command and control module 5 and the physical security box 6 containing all system parts.

When inserting the card into the special slot of half-cylinder 1, sensors 2 sense the card and send a digital signal to the electronic command and control unit 5 to signal that the card is in the pre-set position which further transmits commands to the electric motors 4 which drive the loading and rotating device 2 in order to rotate and load the card into de device performing the transaction and the safe reading of the magnetic strip card. Upon completion of card transactions, the device ejects the cards to the safety system which takes it over through the loading and rotating device 2 and delivers it back to the user in the same manner as it was inserted, thus removing the risk of illegal reading.

The invention claimed is:

1. A magnetic strip card security method comprising handling a magnetic strip card perpendicularly compared to a reading direction of the magnetic strip card, the magnetic strip card having a magnetic strip, the reading direction being defined as the direction in which the magnetic strip extends, the method comprising receiving the magnetic strip card in a device in a direction perpendicular to the reading direction and parallel to a major surface of the magnetic strip card, and rotating the device to thereby rotate the magnetic strip card 90 degrees, bringing the magnetic strip card to a position of the reading direction of the magnetic strip card in a secured manner, wherein the magnetic strip card is rotated about an axis perpendicular to a plane defined by the major surface of the magnetic strip card, and wherein, after the magnetic strip card is rotated about the axis perpendicular to the plane defined by the major surface of the magnetic strip card, the magnetic strip card, while in the device, is moved in the reading direction so that the magnetic strip is ready to be read by an ATM's card reader.

2. Security system for magnetic strip cards comprising a rotatable half-cylinder equipped with a slot of a thickness sized to a magnetic strip card, the magnetic strip card having a magnetic strip, the reading direction being defined as the direction in which the magnetic strip extends, the slot further having a width of one card length, so that the magnetic strip card can be inserted into the slot in a direction perpendicular to the reading direction and parallel to a major surface of the magnetic strip card, a mechanical card loading and rotating device, card motion and position sensors, electrical motors for driving the magnetic strip card in the mechanical card loading and rotating device, an overall electronic command and control module, and a physical security box containing all system parts, wherein the mechanical card loading and rotating device is configured to rotate the half-cylinder to thereby rotate the magnetic strip card about an axis perpendicular to a plane defined by the major surface of the magnetic strip card.

\* \* \* \* \*